United States Patent Office 2,820,012
Patented Jan. 14, 1958

2,820,012

HIGH TEMPERATURE PHTHALAMATE GREASE COMPOSITIONS

Bruce W. Hotten, Orinda, Calif., assignor to California Research Corporation, San Francisco, Calif., a corporation of Delaware No Drawing. Application December 14, 1954
Serial No. 475,299

16 Claims. (Cl. 252—33.6)

This invention is directed to grease compositions having unusually high melting points.

In addition to having high melting points, the grease compositions embodied herein are characterized by being highly resistant to emulsification in water; also, these grease compositions have outstanding properties in work stability, rust prevention, oxidation stability, compatibility, wear reduction, and ease of pumpability. Furthermore, the thickening agents used herein are more efficient as grease-thickening agents, in that smaller amounts of these thickening agents are used in obtaining greases than has heretofore been possible with most of the previous thickening agents.

Engineering advances of recent years have brought about increased speeds for various moving parts of machinery and automotive equipment in general; that is, the gears, bearings, and other moving parts of automotive engines, industrial equipment, etc., operate at considerably greater speeds than heretofore. Also, the use of smaller gears in various pieces of industrial equipment and automotive engines results in higher pressures being applied to these gears.

The continuing trend to manufacture automobiles with lower centers of gravity has made it necessary to use smaller gears, particularly in such gear assemblies as differentials and transmissions. These smaller gears rotate at increased speeds, and they have considerably greater pressures exerted upon them per unit area than the older type gear assemblies. Thus, machines having higher loads on bearings and gears, along with greater speeds, require grease compositions which will function at higher temperatures than heretofore necessary.

It is becoming more and more apparent that, for the most part, greases must be able to lubricate effectively at temperatures considerably in excess of 400° F., and, in certain instances, in the range of 500° F. and higher. Numerous military and industrial grease specifications now describe greases having dropping points of 400° F. as a minimum.

In the past it has been necessary for the lubrication industry to prepare lubricants which were particularly suitable for certain specific jobs. In the lubrication of automotive wheel bearings, steel mill equipment, high speed motors, universal joints, and rocker arms of airplane motors, for example, high melting point lubricants have been essential; while in the lubrication of water pumps, automotive chassis, and valves, it has been essential to use separate greases characterized by low emulsibility in water. Heretofore, the lubrication industry has had to manufacture as many as nine different greases for the lubrication of automotive equipment.

However, industry has long realized that it would be highly efficient and highly desirable to obtain one grease composition embodying the combined characteristics of high melting point, resistance to oxidation, high resistance to emulsification in water, high work stability, and high compatibility with other grease compositions. By various means, attempts have been made to prepare all-purpose greases embodying the characteristics noted hereinabove. For example, greases prepared from sodium soaps of fatty acids are characterized by high melting points, and greases prepared from calcium soaps of fatty acids are characterized by high water resistance. Therefore, attempts have been made to embody both the lime soaps and the soda soaps in one grease composition in order to try to obtain the desirable characteristics of each individual soap. However, the ratio of lime soap to soda soap required to obtain water resistance is so high that the melting point of the mixed grease is greatly reduced.

The use of lithium soaps of fatty acids as grease thickening agents has been a greater step in the right direction. However, the disadvantages of expense, oxidation instability, and excessive changes in texture and consistency on working and on heating have outweighed the advantages of higher melting point and resistance to emulsification. Although various other thickening agents have been prepared for high temperature greases, greases prepared therefrom do not have the exceptionally high dropping points nor the work stability of the greses described in this invention. The improvements which are obtained by the grease thickening agents of this invention over prior thickening agents are due to the anions of the present thickening agents. For example, greases obtained by the use of lithium salts of anions of the thickening agents embodied herein have greater work stability, higher melting points and greater resistance to oxidation than prior lithium grease thickening agents (e. g., lithium soaps of polyamic acids).

Now, by the use of the grease compositions of this invention, it is possible to obtain greases having the combined characteristics of high resistance to emulsification in water, high melting points, high resistance to oxidation, and high work stability. Such greases have a wide variety of applications, particularly where both water and high temperatures are encountered, such as in steel mill motors and transfer table bearings, paper mill roller bearings, automotive wheel bearings under winter and flood conditions, including use in amphibious military vehicles, high temperature cannery equipment, exposed controlled surface bearings for aircraft, etc.

In accordance with the present invention, it has been discovered that greases having the desired characteristics set forth hereinabove can be obtained by thickening a lubricating oil with metal salts of certain phthalamic acids (e. g., terephthalamic acids and isophthalamic acids); that is, phthalamic acids having at least one carbon atom of the benzene nucleus between the benzene carbon atom to which the amido radical is attached and the benzene atom to which the carboxyl radical is attached. Terephthalamic acid salts have the following formula:

I.

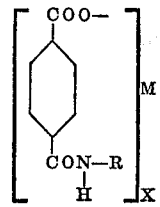

wherein "R" is an organo radical, that is, a straight-chain, branched-chain, or cyclic, saturated or unsaturated hydrocarbon radical, "M" is a metal, and "X" is a number having a value equal to the valence of the metal "M." As a straight-chain or branched-chain radical, "R" can contain from 1 to 22 carbon atoms, preferably from 4 to 22 carbon atoms. As a cyclic radical "R" can contain from 6 to 28 carbon atoms.

When "R" is a straight chain or branched chain radical containing less than 4 carbon atoms, it is preferred to use a gel-transfer method in the preparation of a grease structure. That is, it is preferred that the grease fiber structure be first formed in a hydrocarbon solvent (e. g., toluene), after which the base oil is added and the solvent removed by distillation.

Examples of "R" include the following radicals: methyl, ethyl, propyl, n-butyl, tertiary-butyl, pentyl, 2-methyl butyl, hexyl, 2-methyl pentyl, 2-3 dimethyl butyl, heptyl, isoheptyl, octyl, 2-ethyl hexyl, isooctyl, nonyl, decyl, decenyl, dodecyl, tetradecyl, ethylhexyl, hexyldecyl, hexadecyl, hexadecenyl, octadecyl, octadecenyl, methylphenyl, ethylphenyl, propylphenyl, butylphenyl, octylphenyl, decylphenyl dodecylphenyl, tetradecylphenyl, hexadecylphenyl, octadecylphenyl, octadecenylphenyl, etc.

The metals which can be used in the formation of the soaps of this invention include the metals of groups I, II, III, and IV of Mendeleeff's Periodic Table. Particular metals include lithium, sodium, potassium, silver, magnesium, calcium, zinc, strontium, cadmium, barium, aluminum and lead. Because of the increased melting point and improved texture it is preferred to use lithium, sodium, and barium. Greater work stability, coupled with higher dropping points, are obtained with the sodium soap and the barium soap greases.

Examples of metal salts of terephthalamic acids which are used as thickening agents according to this invention include sodium N-methyl terephthalamate, sodium N-ethyl terephthalamate, sodium N-butyl terephthalamate, sodium N-amyl terephthalamate, sodium N-hexyl terephthalamate, sodium N-octyl terephthalamate, sodium N-decyl terephthalamate, sodium N-tetradecyl terephthalamate, sodium N-hexadecyl terephthalamate, sodium N-octadecyl terephthalamate, sodium N-eicosyl terephthalamate, sodium N-docosyl terephthalamate, sodium N-phenyl terephthalamate, sodium N-methylphenyl terephthalamate, sodium N-butylphenyl terephthalamate, sodium N-hexylphenyl terephthalamate, sodium N-octylphenyl terephthalamate, sodium N-decylphenyl terephthalamate, sodium N-tetradecylphenyl terephthalamate, potassium N-methyl terephthalamate, potassium N-butyl terephthalamate, potassium N-amyl terephthalamate, potassium N-hexyl terephthalamate, potassium N-octyl terephthalamate, potassium N-decyl terephthalamate, potassium N-tetradecyl terephthalamate, potassium N-hexadecyl terephthalamate, potassium N-octadecyl terephthalamate, potassium N-eicosyl terephthalamate, potassium N-docosyl terephthalamate, potassium N-methylphenyl terephthalamate, potassium N-butylphenyl terephthalamate, potassium N-hexylphenyl terephthalamate, potassium N-octylphenyl terephthalamate, potassium N-decylphenyl terephthalamate, potassium N-tetradecylphenyl terephthalamate, barium di(N-methylterephthalamate), barium di(N-butyl terephthalamate), barium di (N-amyl terephthalamate), barium di(N-hexyl terephthalamate), barium di(N-octyl terephthalamate), barium di(N-decyl terephthalamate), barium di(N-tetradecyl terephthalamate), barium di(N-hexadecyl terephthalamate), barium di(N-octadecyl terephthalamate), barium di(N-eicosyl terephthalamate), barium di(N-docosyl terephthalamate), barium di(N-phenyl terephthalamate), barium di(N-methylphenyl terephthalamate), barium di(N-butylphenyl terephthalamate), barium di(N-hexylphenyl terephthalamate), barium di(N-octylphenyl terephthalamate), barium di(N-decylphenyl terephthalamate), barium di(N-tetradecylphenyl terephthalamate), etc.

The isophthalamic acid salts which are used as grease thickening agents herein have the following formula:

II.

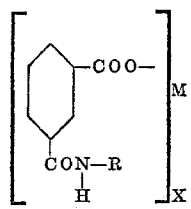

wherein "R," "N," and "X" are the same as in Formula I, with the exception that the number of carbon atoms in the R radicals may be less. As a general rule, metal salts of isophthalamic acids are more oil soluble than the corresponding metal salts of terephthalamic acids having a similar R radical. Therefore, the straight-chain or branched-chain radicals of the isophthalamic acids may contain from 2 to 4 carbon atoms less than the corresponding radicals of the terephthalamic acids. It is preferred that the R radical in Formula II, hereinabove, contain from 2 to 20 carbon atoms.

Examples of metal salts of isophthalamic acids include the following: sodium N-ethyl isophthalamate, sodium N-butyl isophthalamate, sodium N-hexyl isophthalamate, sodium N-heptyl isophthalamate, sodium N-octyl isophthalamate, sodium N-decyl isophthalamate, sodium N-dodecyl isophthalamate, sodium N-tetradecyl isophthalamate, sodium N-hexadecyl isophthalamate, sodium N-octadecyl isophthalamate, sodium N-eicosyl isophthalamate, sodium docosyl isophthalamate, sodium N-methylphenyl isophthalamate, sodium N-ethylphenyl isophthalamate, sodium N-butylphenyl isophthalamate, sodium N-octylphenyl isophthalamate, sodium N-decylphenyl isophthalamate, sodium N-dodecylphenyl isophthalamate, sodium N-tetradecylphenyl isophthalamate, sodium N-octadecylphenyl isophthalamate, lithium N-ethyl isophthalamate, lithium N-butyl isophthalamate, lithium N-hexyl isophthalamate, lithium N-heptyl isophthalamate, lithium N-octyl isophthalamate, lithium N-decyl isophthalamate, lithium N-dodecyl isophthalamate, lithium N-tetradecyl isophthalamate, lithium N-hexadecyl isophthalamate, lithium N-octadecyl isophthalamate, lithium N-eicosyl isophthalamate, lithium N-docosyl isophthalamate, lithium N-methylphenyl isophthalamate, lithium N-ethylphenyl isophthalamate, lithium N-butylphenyl isophthalamate, lithium N-octylphenyl isophthalamate, lithium N-decylphenyl isophthalamate, lithium N-dodecylphenyl isophthalamate, lithium N-tetradecylphenyl isophthalamate, lithium N-octadecylphenyl isophthalamate, barium di(N-ethyl isophthalamate), barium di(N-butyl isophthalamate), barium di(N-hexyl isophthalamate), barium di(N-heptyl isophthalamate), barium di(N-octyl isophthalamate), barium di(N-decyl isophthalamate), barium di(N-dodecyl isophthalamate), barium di(N-tetradecyl isophthalamate), barium di(N-hexadecyl isophthalamate), barium di(N-octadecyl isophthalamate), barium di(N-eicosyl isophthalamate), barium di(N-docosyl isophthalamate), barium di(N-methylphenyl isophthalamate), barium di(N-ethylphenyl isophthalamate), barium di(N-butylphenyl isophthalamate), barium di(N-octylphenyl isophthalamate), barium di(N-decylphenyl isophthalamate), barium di(N-dodecylphenyl isophthalamate), barium di(N-tetradecylphenyl isophthalamate), barium di(N-octadecylphenyl isophthalamate), etc.

Grease compositions thickened with the metal salts of terephthalamic acids have melting points (i. e., dropping points) which are considerably higher than grease compositions thickened with metal salts of isophthalamic acids. Whereas metal salts of isophthalamic acids can be used in the preparation of greases having dropping points of about 300° F., it is essential to use salts of terephthalamic acids in the preparation of greases having melting points of about 500° F.

Lubricating oils which are suitable base oils for the compositions of this invention include a wide variety of lubricating oils, such as naphthenic base, paraffin base, and mixed base, other hydrocarbon lubricants, e. g., lubricating oils derived from coal products, and synthetic oils, e. g., alkylene polymers (such as polymers of propylene, butylene, etc., and mixtures thereof), alkylene oxide type polymers, dicarboxylic acid esters, liquid esters of acids of phosphorus, alkylbenzene polymers, ploymers of silicon, etc. Synthetic oils of the alkylene oxide type polymers which may be used include those exemplified by the alkylene oxide polymers (e. g., propylene oxide polymers) and derivatives, including alkylene oxide polymers prepared by polymerizing the alkylene oxides, e. g., propylene oxide, in the presence of water or alcohols, e. g., ethyl alcohol, esters of ethylene oxide type polymers, e. g., acetylated ethylene oxide polymers prepared by acetylating ethylene oxide polymers containing hydroxyl groups; polyethers prepared from ethylene glycols, e. g., ethylene glycol, etc.

The polymeric products prepared from the various alkylene oxides and alkylene glycols may be polyoxyalkylene diols or polyalkylene glycol derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azeleic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, and di-N-hexyl fumarate polymer.

Synthetic oils of the alkylbenzene type include those which are prepared by alkylating benzene (e. g., dodecyl benzene, tetradecylbenzene, etc.).

Synthetic oils of the type of polymers of silicon include the liquid esters of silicon and the polysiloxanes, which include those exemplified by tetraethyl silicate, tetraisopropyl silicate, tetra(methyl-2-butyl) silicate, tetra(4-methyl-2-penta) silicate, tetra(1-methoxy-2-propyl) silicate, hexyl(4-methyl-2-pentoxy) disiloxane, poly(methyl) siloxane, poly(methylphenyl) siloxane, and poly(siloxy glycols), etc.

The above base oils may be used individually as such, or in various combinations, wherever miscible or wherever made so by the use of mutual solvents.

When alkylene oxide polymers or polymers of silicon are the base oils, it is preferable that the grease gel structure be formed first in a hydrocarbon solvent, e. g., toluene, after which the alkylene oxide type polymer, or the polymer of silicon is added, and the solvent removed by distillation or by other means. In addition to the hydrocarbon solvent, the solvent may be a blend of a hydrocarbon solvent and an alcohol (e. g., petroleum thinner and ethyl alcohol).

A process of preparing grease compositions using the thickening agents of this invention, regardless of the type base oil which may be desired, includes the formation of an admixture of the acid of a grease thickening agent of this invention (i. e., an isophthalamic acid or a terephthalamic acid), a basic substance (e. g., a sodium hydroxide), a solvent for the basic substance (e .g., water), and a base oil. The resulting composition is then subjected to a shearing force sufficient to form the soap of the phthalamic acid and sufficient to disperse the resulting soap in the oil, forming a grease-like structure.

The metal salts of phthalamic acids used according to this invention as thickening agents for grease compositions may be prepared by numerous methods. For example, one method, which method is believed to be new, includes treating a diester of terephthalic acid, e. g., dimethyl terephthalate, with a non-aqueous solution of a basic reagent (e. g., potassium hydroxide in absolute alcohol) to hydrolyze one of the ester groups, forming a monometal salt of an ester of terephthalic acid. This monosalt of the monoester of terephthalic acid (or the monoester of terephthalic acid) is treated with thionyl chloride to form the monoacid chloride of the terephthalic acid ester. This chloride is treated with an amine to form the monoester of terephthalamic acid, which ester is treated with a metal oxide or hydroxide to form the desired metal salt of terephthalamic acid which is used as a thickening agent in the formation of grease compositions.

According to another method for the preparation of metal salts of phthalamic acids, an amine is reacted directly with an ester of terephthalic acid or isophthalic acid, and the resulting product is neutralized with the desired metal oxide or hydroxide to form the salt thickener. However, it is occasionally noticed that greases obtained from thickening agents prepared by this latter method have lower melting points than greases thickened with agents prepared in accordance with the first method outlined hereinabove.

The metal salts of terephthalmic acids and the isophthalamic acids of this invention are admixed with lubricating oils in amounts sufficient to form grease compositions, that is, sufficient to thicken the oils to the consistency of a grease. As noted hereinabove, the grease thickening agents of this invention are more efficient in their thickening power than that of thickening agents heretofore available. It is not necessary to use the amounts usually necessary with other thickening agents of the lubrication art. Although from 5% to 50%, by weight, of the grease thickening agents may be incorporated in grease compositions, it is preferred to use amounts of from 7% to 30%. However, whereas amounts of 15% of prior thickening agents are used in the preparation of grease compositions, only about 10% and less of the thickening agents of this invention are necessary in the formation of grease compositions. The examples presented hereinbelow illustrate the preparation of metal salts of phthalamic acids and the grease compositions therefrom according to the invention.

*Example 1.—Preparation of methyl N-"octadecyl" terephthalamate*

A mixture of 45 pounds of dimethyl terephthalate and 255 pounds of benzene was heated to 130° F. until all of the dimethyl terephthalate was dissolved, after which a solution of 12.3 pounds of potassium hydroxide in 58.5 pounds of absolute alcohol was added. The heating was continued at 130° F. for an additional 50 minutes.

It is to be particularly noted that in this reaction only one methyl group is saponified, and when this saponification has been completed, the salt precipitates from the benzene-alcohol mixture.

10 gallons of water was added to the above mixture to dissolve the potassium salt of monomethyl terephthalate thus formed. The aqueous layer of the salt was separated, and to this aqueous layer was added 3.5 liters of concentrated sulfuric acid at room temperature to form the free acid having the formula:

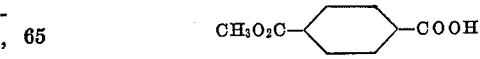

This acid was filtered, washed with water and dried in vacuo. After purification, the neutralization equivalent of the acid thus formed was 180, which is equal to the theoretical neutralization equivalent.

28 pounds of the acid was dispersed in 37 pounds of benzene and heated to about 185° F., after which 20.5 pounds of thionyl chloride was added over a period of 2 hours at 185° F. After the complete addition of the thionyl chloride, the mixture was refluxed for 4 hours. The excess thionyl chloride and benzene was then removed by distillation. The product obtained at this point has the formula:

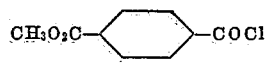

A mixture of 25 pounds of this acid chloride, 9.5 pounds of triethyl amine and 26.6 pounds of "octadecyl" amine was heated at about 150° F. until the amine had substantially wholly dispersed, after which the mixture was heated at 180° F. for 15 minutes.

To the above mixture was added 15 gallons of water at 195° F., after which the mixture was filtered.

The "octadecyl" terephthalamic acid ester thus prepared was washed three times with hot water and dried. The saponification equivalent of the final product was 471 (the average of four determinations).

The "octadecyl" amine used herein was a commercial preparation of amines known as Armeen HT, sold by the Armour Company, and containing 25% hexadecylamine, 70% octadecylamine, and 5% octadecenylamine. 85% of this mixture consists of N-primary amines.

*Example 2.—Preparation of methyl N-"decyl" terephthalamate*

122 grams of "decyl" amine, 158 grams of methyl terephthaloyl chloride, and 85 grams of triethylamine were charged to a reaction flask and heated to temperatures as high as 245-265° F. for a period of about 10 minutes. The reaction product was water washed three times with vigorous agitation to remove the water-soluble triethyl ammonium chloride, after which the product was crystallized twice from 95% ethanol and dried. The reaction product had a saponification number of 324 (theory equals 336).

The "decyl" amine was obtained from "Armeen 10D," a product sold by the Armour Company, Chicago, Illinois, and containing 90% decylamine, 3% octylamine, and 7% dodecylamine.

*Example 3.—Preparation of methyl N-"tallow" terephthalamate*

A mixture of 244 grams of "tallow" amine, 180 grams of methyl terephthaloyl chloride, 95 grams of triethylamine, and 35 ml. of benzene was heated to temperatures of about 245-265° F., with agitation, for a period of about 10 minutes, after which the product was thoroughly water washed to remove the triethyl ammonium chloride. The reaction product had a saponification number of 468 (theory equals 472).

*Example 4.—Preparation of methyl N-"octadecyl" terephthalamate*

A mixture of 107 grams of methyl terephthaloyl chloride, 138 grams of "octadecyl" amine, 55 grams of triethylamine, and a small amount of benzene was heated to 245-265° F. for a period of about 10 minutes. After the reaction product was water washed, the benzene was removed by distillation. The product, which was crystallized from alcohol, had a saponification number of 409 (theory equals 438), and a melting point of 117° C. The "octadecyl" amine was a product known as "Armeen 18D," which is sold by the Armour Company, Chicago, Illinois, and contains 98% octadecylamine.

*Example 5.—Preparation of methyl N-butyl terephthalamate*

A mixture of 225 grams (1 mole) of potassium methyl terephthalate, 146 grams (2 moles) of N-butylamine, and approximately 1 liter of toluene was charged to a 2-liter resin flask. To this mixture 43.6 ml. of phosphorus trichloride was added dropwise over a period of 35 minutes at temperatures ranging from about 75° F. to about 155° F. The whole mixture was heated at the reflux temperature of 230° F. for a period of 6 hours, after which it was cooled to room temperature, acidified with hydrochloric acid, and washed with hot water until the chloride ion test was negative. The mixture was then made basic with ammonium hydroxide and water washed until no methyl hydrogen terephthalate was obtained on acidification. The methyl N-butyl terephthalamate was recovered as white crystals. The saponification equivalent was 245 (theory equals 235), the percent nitrogen was 5.99 (theory equals 5.96), and the melting point was 250° F. This compound was soluble in hot toluene, in mineral oil at 300° F., and in phenylmethyl polysiloxane (Dow-Corning 550) at 300° F.

*Example 6.—Preparation of methyl N-phenyl terephthalamate*

A mixture of 146 grams of potassium methyl terephthalate, 150 grams of aniline, and 750 ml. of toluene was charged to a 2-liter resin flask. To this mixture 35.4 ml. of phosphorus trichloride were added dropwise over a temperature range of about 75° F. to about 155° F., after which the mixture was heated at 230° F. for a period of 6 hours. The mixture was cooled to room temperature, acidified with hydrochloric acid, and washed free of the chloride ion. The mixture was made basic with ammonium hydroxide, then water washed until the acidified extract yielded no precipitate (test for methyl hydrogen terephthalate) on acidification. The raffinate was cooled and filtered, and the crystals obtained therefrom were recrystallized from isopropanol. The crystals, which had a melting point of 380° F., contained 5.41% nitrogen (theory equals 5.49). These crystals were insoluble in toluene, and they were soluble in mineral oil and in phenylmethyl polysiloxane (Dow-Corning 550) at 400° F. When the mineral oil and the phenylmethyl polysiloxane solutions were cooled to ambient temperatures, a paste was obtained.

*Example 7.—Preparation of octadecyl N-"octadecyl" terephthalamate*

A mixture of 21 grams of methyl N-"octadecyl" terephthalamate, 16 grams of n-octadecanol, and 1 gram of sodium methylate was heated, with stirring, for 2 hours at 390° F. The methanol which was formed was removed by distillation, and the crystalline material was recrystallized from toluene.

Rather than go through all the steps of the above examples, the amide can be prepared by reacting the amine and dimethyl terephthalamate directly. However, greases prepared from such amides are of poor quality because the presence of a diamide in the grease composition lowers the melting point.

*Example 8.—Preparation of barium di(N-"octadecyl" terephthalamate)*

A mixture of 15 grams of methyl N-"octadecyl" terephthalamate, 8 grams of barium hydroxide octahydrate in 20 ml. of water, and 200 ml. of Carbitol (the monoethyl ether of diethylene glycol) was heated at reflux temperatures of 240° F. for a period of 4 hours. The reaction mixture was washed with hot dioxane. The resulting barium di(N-"octadecyl" terephthalmate) had a melting point in excess of 930° F. The sulfate ash was 27.5% (theory equals 28.0%).

*Example 9.—Preparation of grease thickened with the sodium N-"octadecyl" terephthalamate of Example 1*

A mixture of 66 pounds of the methyl N-"octadecyl" terephthalamic acid ester of Example 1, 0.6 pound of sodium hydroxide and 132 pounds of a California solvent-refined paraffin base oil having a viscosity of 1700

S. S. U. at 100° F. was heated to 320° F. at a pressure of 73 pounds per square inch for 1 hour. The mixture was then blown with air to remove water, after which an additional 35 pounds of the same base oil was added, and the mixture was heated to 600° F. For the purpose of preparing a grease containing 10% of this sodium terephthalamate, 4.4 pounds of this mixture was further diluted with 0.88 pound of the same base oil. The whole mixture was then drawn into shallow pans and cooled, after which it was milled through a colloid mill. The grease thus prepared had a melting point (i. e., a dropping point) of 504° F.

*Example 10.—Preparation of a grease thickened with barium N-"octadecyl" terephthalamate*

A mixture of 250 grams of the methyl ester of N-"octadecyl" terephthalamate, 97.5 grams of barium hydroxide monohydrate in 1500 grams of water and 2152.2 grams of a California solvent-refined paraffin base oil having a viscosity of 480 S. S. U. at 100° F. was slowly heated to a maximum temperature of 300° F., after which the mixture was cooled to 130° F. The cooled mixture was introduced into a Manton-Gaulin colloid mill at the rate of 3 pounds per minute at a pressure of 4000 p. s. i. g. The temperature of the mixture as it went into the mill was 130° F., and the temperature of the resulting grease coming out of the mill was 180° F. The grease composition had a work penetration of 321 after 60 strokes on the A. S. T. M. worker, and the A. S. T. M. dropping point was 500+ F.

*Example 11.—Preparation of a grease thickened with calcium N-"octadecyl" terephthalamate*

A mixture of 250 grams of the methyl ester of N-"octadecyl" terephthalamate, 22.5 grams of calcium hydroxide in 25 grams of water, and 2227.5 grams of a California solvent refined paraffin base oil having a viscosity of 480 S. S. U. at 100° F. was slowly heated to a temperature of 200° F., then cooled to a temperature of 130° F. At this latter temperature, the mixture was passed through a Manton-Gaulin colloid mill at a rate of 3 pounds per minute at a pressure of 4000 p. s. i. g. The temperature of the thickened composition as it came from the colloid mill was 170° F.

*Example 12.—Preparation of a grease thickened with lithium N-"octadecyl" terephthalamate*

A mixture of 250 grams of the methyl ester of N-"octadecyl" terephthalamate, 25.9 grams of lithium hydroxide monohydrate in 30 grams of water, and 2224.1 grams of a California solvent refined paraffin base oil having a viscosity of 480 S. S. U. at 100° F. was slowly heated to a temperature of 220° F. with rapid stirring, then heated to 300° F. for dehydration. The mixture was then cooled to 130° F., and passed through a Manton-Gaulin colloid mill at the rate of 3 pounds per minute at a pressure of 4000 p. s. i. g. The temperature of the grease composition coming out of the colloid mill was 185° F. The grease composition had a penetration value of 264 after 60 strokes in the A. S. T. M. worker, and the A. S. T. M. dropping point was 430° F.

*Example 13.—Preparation of grease thickened with sodium N-butyl terephthalamate*

A mixture of 29 grams of methyl N-butyl terephthalamate and 170 grams of a California solvent refined paraffinic base oil having a viscosity of 480 S. S. U. at 100° F. was heated to 290° F. with agitation, then cooled to room temperature. An aqueous solution of 4.74 grams of sodium hydroxide in 20 ml. of water was blended into the oil mixture, after which the whole composition was forced through a ¼ inch needle valve (½ turn open) at 2000–3000 p. s. i. The mixture was heated to 300° F., cooled to room temperature, and then milled four times through the same needle valve (¼ turn open) at 5000 p. s. i.

The resulting grease composition had an ASTM worked penetration of 370 and an ASTM dropping point of 500+° F.

*Example 14.—Preparation of grease thickened with sodium N-p-tolyl terephthalamate*

A mixture of 29.1 grams of methyl N-p-tolyl terephthalamate and 170 grams of a California solvent refined paraffin base oil having a viscosity of 480 SSU at 100° F. was heated to 170° F., then cooled to room temperature. An aqueous solution of 4.54 grams of sodium hydroxide in 20 ml. of water was blended into the oil mixture, after which the whole composition was forced through a ¼ inch needle valve (½ turn open) at 2000–3000 p. s. i. The mixture was heated to 300° F., cooled to room temperature, and milled four times through the ¼ inch needle valve (¼ turn open) at 5000 p. s. i.

The table hereinbelow presents further data on grease compositions of this invention.

The thickening agents of greases Nos. 1 and 2 of the table were prepared as set forth in Example 15.

*Example 15*

Dimethyl terephthalate was reacted with "octadecyl" amine, forming a ternary mixture of unreacted dimethyl terephthalate, monomethyl terephthalamate, and the diamide of terephthalic acid. The reaction mixture was treated with potassium hydroxide to form the potassium salts of the unreacted dimethyl terephthalate and the monoamide. The diamide was removed by filtration. The potassium salts are soluble in water-alcohol mixtures. The filtrate was acidified, forming terephthalic acid and terephthalamic acid, which two components were separated by dissolving the terephthalamic acid in hot toluene and filtering to separate the insoluble terephthalic acid. Upon cooling the toluene solution, the terephthalamic acid crystallized.

The thickening agents of greases Nos. 3–11 of the table were prepared according to the method set forth in Examples 1 and 2, hereinabove.

With the exception of grease No. 11, the amine portion of the thickening agents was obtained from Armeen HT. The amine portion of grease No. 11 was obtained from Armeen 10D, which is a mixture of amines comprising 90% decylamine, 3% octylamine, and 7% dodecylamine.

In the boiling water test, a sample of the grease was placed in boiling water and the boiling continued for 60 minutes, or until the grease began to disintegrate.

The penetration values in the table under the "antifriction" column were obtained after the grease had been worked, as follows:

The grease to be tested was packed into two No. 208 ball bearings which were full of the test grease. The ball bearings were mounted on a splined shaft and spring-loaded axially at 550 pounds. The bearings rotated at a speed of 1750 R. P. M. In the test, the bearings were rotated for 18 hours at 250° F.

The ASTM worker test is the ASTM test No. D–217 described in the Petroleum Division of the ASTM Manual of Test Procedures. In this test, a perforated disk was plunged through a grease sample for the designated number of strokes (e. g., 60 strokes) at 77° F., after which the penetration value was obtained.

The base oils used in the preparation of these greases are described as follows: The naphthenic base oil was a California solvent-refined naphthenic base oil having a viscosity of 450 SSU at 100° F.; the paraffinic base oil was a California solvent-refined paraffinic base oil having a viscosity of 480 SSU at 100° F.; the sebacate base oil was a di(2-ethylhexyl) sebacate; the siloxane base oil was a poly(methylphenyl) siloxane; the silicate base oil was 2-ethylhexyl tetrasilicate; and the mineral base oil was a California solvent-refined naphthenic base oil having a viscosity of 1705 SSU at 100° F.

TABLE

| No. | Soap cation | Base oil | Soap conc., percent wt. | Penetration 60 strokes, ASTM worker | Penetration Anti-friction | Melting point, °F. | Boiling water test (mins.) |
|---|---|---|---|---|---|---|---|
| 1 | Li | Naphthenic | 15 | 345 | 328 | 330 | 60+ |
| 2 | Na | do | 12 | 292 | 272 | 500+ | 60+ |
| 3 | Na | do | 10 | 264 | 236 | 500+ | 60+ |
| 4 | Na | Paraffinic | 10 | 266 | 289 | 360 | 60+ |
| 5 | Na | Sebacate | 10 | 265 | 388 | 269 | 60+ |
| 6 | Na | Siloxane | 10 | | | | 60+ |
| 7 | Na | Silicate | 10 | 219 | | 500+ | 60+ |
| 8 | Li | Naphthenic | 10 | 286 | | 429 | 60+ |
| 9 | Ba | do | 10 | 296 | | 444 | 60+ |
| 10 | Na | Mineral | 10 | 282 (¹ 309) | | 470 | 60+ |
| 11 | Na | Naphthenic | 10 | 397 | | 400–500 | 60+ |

¹ The penetration value after 100,000 strokes in the ASTM worker at 77° F.

The resistance of the grease compositions of this invention to emulsification in water is illustrated by the boiling water test data of the foregoing table, wherein all of the grease compositions were still intact when the tests had been run for more than 60 minutes.

The remarkable work stability of the greases herein is shown by the slight increase in penetration on working. For example, in grease No. 10 of the table, the penetration value was 282 after 60 strokes of the ASTM worker. However, after 100,000 strokes of the ASTM worker, the penetration value of this grease was only 309.

Example 16 illustrates the preparation of a metal salt of isophthalamic acid and a grease therefrom.

*Example 16.—Preparation of N-"octadecyl" isophthalamic acid*

33.5 grams of ethyl-hydrogen-isophthalate was suspended in benzene, to which was slowly added 21.6 grams of thionyl chloride. 35 grams of "octadecyl" amine (in a benzene solution) was added to the monoacid chloride of ethyl isophthalate in the presence of triethylamine, forming N-"octadecyl" isophthalamic acid.

1.46 grams of sodium hydroxide was added to 15.2 grams of this N-"octadecyl" isophthalamic acid in 85 grams of a California solvent-refined paraffin base oil having a viscosity of 450 SSU at 100° F. The whole mixture was heated to 360° F., then placed in shallow pans to cool. The resulting grease had an ASTM penetration (worked 60 strokes) of 191, and a dropping point of 230° F.

As set forth hereinabove, the preferred processing for dispersing the thickening agents of this invention in alkylene oxide polymers and silicon polymers is by a transfer method. For example, an ester of terephthalamic acid may be dissolved in a petroleum thinner-alcohol mixture, to which is added an alkali metal hydroxide dissolved in an alcohol-water mixture. When this mixture is refluxed, a stiff gel results. This gel may be added to a silicone base oil (e. g., a poly(methylphenyl) siloxane), then heated to remove the alcohol and thinner. This procedure is exemplified by the following Example 17.

*Example 17*

60 grams of ethyl-N-octadecyl terephthalamate was dissolved in 575 ml. of a petroleum thinner and 150 ml. of absolute alcohol. To this mixture was added an aqueous solution of 5.2 grams of sodium hydroxide in 100 ml. of an alcohol-water mixture in the ratio of 70 parts of alcohol to 30 parts of water. This whole mixture was refluxed for one hour, at which time a stiff gel formed. This gel was added to 240 grams of a poly(methylphenyl) siloxane, and the whole mixture was heated to 300° F. to remove the alcohol and thinner. Another 128 grams of the poly(methylphenyl) siloxane was added and the mixture was heated to 475° F. With 14% thickener, the grease had a work penetration of 263 and a dropping point of 500+° F.

Besides being excellent thickening agents for greases, the thickening agents of this invention are suitable as improving agents in lubricating oils, in pigment manufacture, in dusting powders, for imparting greater waterproofness in such materials as leather, textiles, wood and other fibrous or porous materials, etc. Also, the thickening agents herein are useful as gelling agents for plastigels.

In addition to the agents noted herein, the grease compositions of this invention may contain oxidation inhibitors (e. g., dihydroxyanthraquinones, metal organo dithiophosphates, etc.), rust inhibitors (e. g., metal petroleum sulfonates), lubricating agents (e. g., aromatic phosphates), color correctors, stringiness agents, etc.

In contrast to the behavior of grease compositions thickened with the presently used grease-thickening agents (e. g., the metal soaps of fatty acids, such as lithium stearate), the greases of the present invention do not pass through phase changes as they are heated to their dropping points. When the grease compositions which have been prepared from the usual grease-thickening agents are subjected to vacuum filtration at temperatures increasing from room temperature to that of the dropping point, there is a gradual increase in the volume of the filtrate up to a temperature at which a phase change takes place and the mass becomes a rubbery gel, at which time the volume of the filtrate decreases. As the temperature is further increased, the gel is broken and the remainder of the grease composition rapidly passes through the filter until almost 100% of the grease appears as a filtrate. However, grease compositions prepared from the grease-thickening agents of the present invention do not pass through this phase change. Instead, the volume of the filtrate gradually increases with the rise in temperature until all of the grease has passed through the filter. The effective lubricating properties of greases are minimized when the grease-thickening agents pass through phase changes below the dropping point of that grease, in that the formation of rubbery gels draws the grease compositions away from the surfaces being lubricated.

This application is a continuation-in-part of Hotten application Serial No. 401,697, filed December 31, 1953 and now abandoned.

I claim:

1. A grease composition comprising a major proportion of an oil of lubricating viscosity, and, in an amount sufficient to thicken said lubricating oil to the consistency of a grease, a metal salt of an N-organo phthalamic acid having at least one carbon atom of the benzene nucleus between the benzene carbon atom to which the amido radical is attached and the benzene carbon atom to which the carboxyl radical of said phthalamic acid is attached, and wherein said organo group is selected from the group consisting of straight-chain, branched-chain, saturated and unsaturated hydrocarbon radicals containing from 1 to 22 carbon atoms, and cyclic saturated and unsaturated hydrocarbon radicals containing from 6 to 28 carbon atoms, said metal being selected from the group consisting of metals of groups I and II of Mendeleef's Periodic Table.

2. A grease composition comprising a major proportion of an oil of lubricating viscosity, and, in an amount sufficient to thicken said lubricating oil to the consistency of a grease, a metal salt of an N-organo phthalamic acid having at least one carbon atom of the benzene nucleus between the benzene carbon atom to which the amido radical is attached and the benzene carbon atom to which the carboxyl radical of said phthalamic acid is attached, and wherein said organo group is selected from the group consisting of straight-chain, branched-chain, saturated and unsaturated hydrocarbon radicals containing from 4 to 22 carbon atoms, and cyclic saturated and unsaturated hydrocarbon radicals containing from 6 to 28 carbon atoms, said metal being selected from the group consisting of metals of groups I and II of Mendeleef's Periodic Table.

3. A grease composition comprising a major proportion of an oil of lubricating viscosity, and, in an amount sufficient to thicken said lubricating oil to the consistency of a grease, a metal salt of an N-alkyl phthalamic acid having at least one carbon atom of the benzene nucleus between the benzene carbon atom to which the amido radical is attached and the benzene carbon atom to which the carboxyl radical of said phthalamic acid is attached, and wherein said alkyl group contains from 1 to 22 carbon atoms and said metal is selected from the group consisting of alkali metals and alkaline earth metals.

4. A grease composition comprising at least 50%, by weight, of an oil of lubricating viscosity, and, in an amount sufficient to thicken said lubricating oil to the consistency of a grease, a thickening agent selected from the group consisting of metal salts of terephthalamic acids and isophthalamic acids, wherein said metal is selected from the group consisting of alkali metals and alkaline earth metals.

5. A grease composition comprising at least 50%, by weight, of an oil of lubricating viscosity, and, in an amount sufficient to thicken said lubricating oil to the consistency of a grease, a thickening agent selected from the group consisting of metal salts of N-alkyl terephthalamic acid and metal salts of N-alkyl isophthalamic acids, wherein said alkyl groups contain from 1 to 22 carbon atoms and said metal is selected from the group consisting of alkali metals and alkaline earth metals.

6. A grease composition comprising at least 50%, by weight, of a lubricating oil and from 5% to 50%, by weight, of a thickening agent selected from the group consisting of metal salts of N-alkyl terephthalamic acids and metal salts of N-alkyl isophthalamic acids, wherein said alkyl groups each contain from 1 to 22 carbon atoms, and wherein said metal is selected from the group consisting of alkali metals and alkaline earth metals.

7. A grease composition comprising at least 50% of a lubricating oil, and, in an amount sufficient to thicken said oil to the consistency of a grease, a thickening agent selected from the group consisting of a metal terephthalamate of the formula:

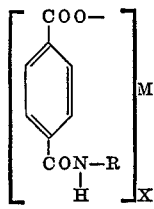

wherein R is a hydrocarbon radical containing from 1 to 22 carbon atoms, M is a metal selected from the group consisting of alkali metals and alkaline earth metals, and X is a number equal to the valence of said metal, and a metal isophthalamate of the formula:

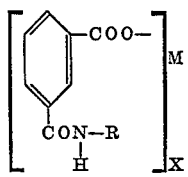

wherein R is a hydrocarbon radical containing from 2 to 20 carbon atoms, M is a metal selected from the group consisting of alkali metals and alkaline earth metals, and X is a number equal to the valence of said metal.

8. A grease composition comprising at least 50% of a lubricating oil, and, in an amount sufficient to thicken said lubricating oil to the consistency of a grease, a metal terephthalamate of the formula:

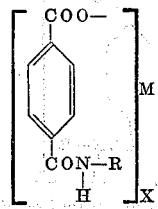

wherein R is a hydrocarbon radical containing from 1 to 22 carbon atoms, M is a metal selected from the group consisting of alkali metals and alkaline earth metals, and X is a number equal to the valence of M.

9. A grease composition comprising at least 50% of a lubricating oil, and, in an amount sufficient to thicken said lubricating oil to the consistency of a grease, an alkali metal salt of terephthalamic acid of the formula:

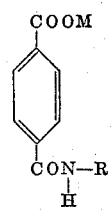

wherein R is an aliphatic radical containing from 1 to 22 carbon atoms, and M is an alkali metal.

10. A grease composition comprising a major proportion of a lubricating oil, and from 5% to 50%, by weight, of a sodium terephthalamate of the formula:

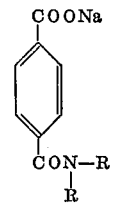

wherein R is an aliphatic radical containing from 1 to 22 carbon atoms.

11. A grease composition comprising a major proportion of a lubricating oil, and from 5% to 50%, by weight, of a barium terephthalamate of the formula:

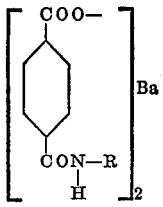

wherein R is an aliphatic radical containing from 1 to 22 carbon atoms.

12. A grease composition comprising a major proportion of a lubricating oil, and from about 7% to 30%, by weight, of a sodium terephthalamate of the formula:

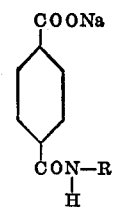

wherein R is an aliphatic radical containing from 1 to 22 carbon atoms.

13. A grease composition comprising a major proportion of a lubricating oil, and from about 7% to 30%, by weight, of a barium terephthalamate of the formula:

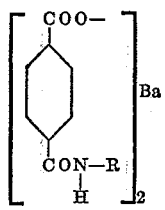

wherein R is an aliphatic radical containing from 1 to 22 carbon atoms.

14. A grease composition comprising a major proportion of a lubricating oil thickened with from 7% to 30% of a sodium N-alkyl terephthalamate, wherein said alkyl radical is a mixture of hexadecyl, octadecyl, and octadecenyl radicals.

15. A grease composition comprising a major proportion of a lubricating oil thickened with an alkali metal salt of isophthalamic acid of the formula:

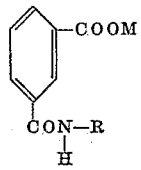

wherein R is an aliphatic radical containing from 2 to 20 carbon atoms, and M is an alkali metal.

16. A grease composition comprising a major proportion of a lubricating oil thickened with an alkaline earth metal salt of isophthalamic acid of the formula:

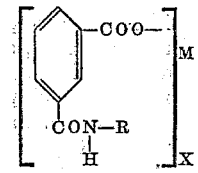

wherein R is an aliphatic radical containing from 2 to 20 carbon atoms, M is an alkaline earth metal, and X is a number having a value equal to the valence of said metal.

References Cited in the file of this patent
UNITED STATES PATENTS

| | | |
|---|---|---|
| 2,275,006 | Binder | Mar. 3, 1942 |
| 2,378,442 | Smith et al. | June 19, 1945 |
| 2,378,443 | Smith et al. | June 19, 1945 |
| 2,408,102 | Smith et al. | Sept. 24, 1946 |
| 2,408,103 | Smith et al. | Sept. 24, 1946 |
| 2,556,665 | Smith et al. | June 12, 1951 |
| 2,578,851 | Smith et al. | Dec. 18, 1951 |
| 2,604,449 | Bryant et al. | July 22, 1952 |
| 2,640,812 | Bryant et al. | June 2, 1953 |
| 2,699,427 | Smith et al. | Jan. 11, 1955 |
| 2,756,213 | Dixon | July 24, 1956 |

UNITED STATES PATENT OFFICE
Certificate of Correction

Patent No. 2,820,012                                January 14, 1958

Bruce W. Hotten

It is hereby certified that error appears in the printed specification of the above numbered patent requiring correction and that the said Letters Patent should read as corrected below.

Column 14, lines 35 to 43, claim 10, the formula should appear as shown below instead of as in the patent:

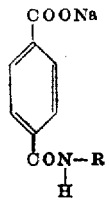

Signed and sealed this 18th day of March 1958.

[SEAL]

Attest:
KARL H. AXLINE,
*Attesting Officer.*

ROBERT C. WATSON,
*Commissioner of Patents.*